Jan. 24, 1928.
H. D. PENNINGTON
1,657,315
APPARATUS FOR AND METHOD OF DELIVERING PIPE TO AND FROM
THREADING MACHINES AND TESTERS
Filed Aug. 28, 1923
3 Sheets-Sheet 2
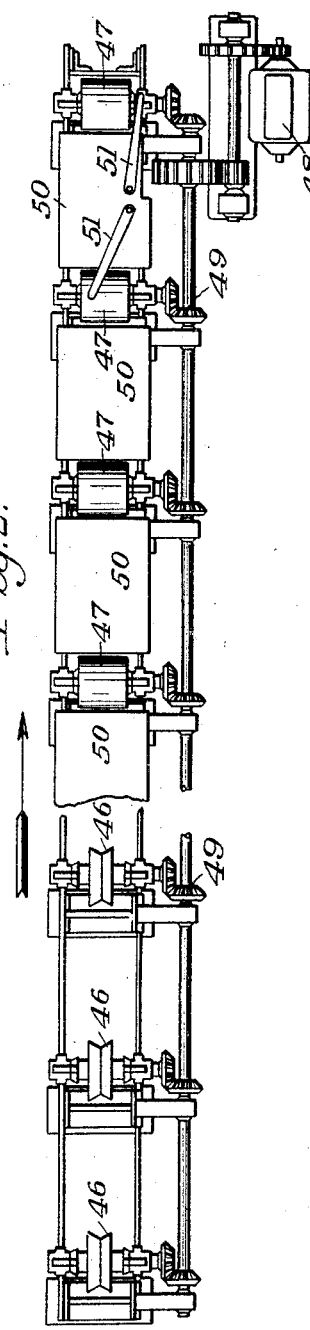
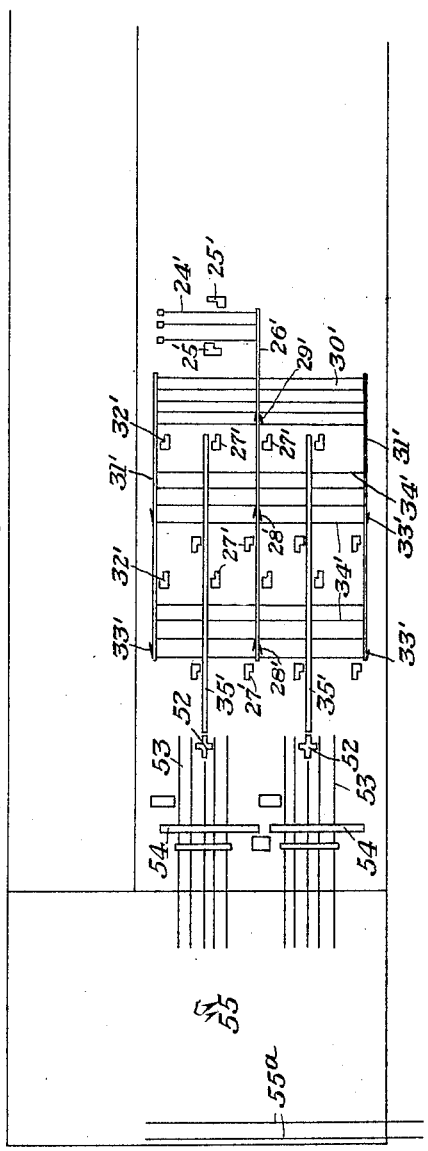
INVENTOR
Harley D. Pennington
By Byrnes, Stebbins & Barnwell
His Attys Patented Jan. 24, 1928.

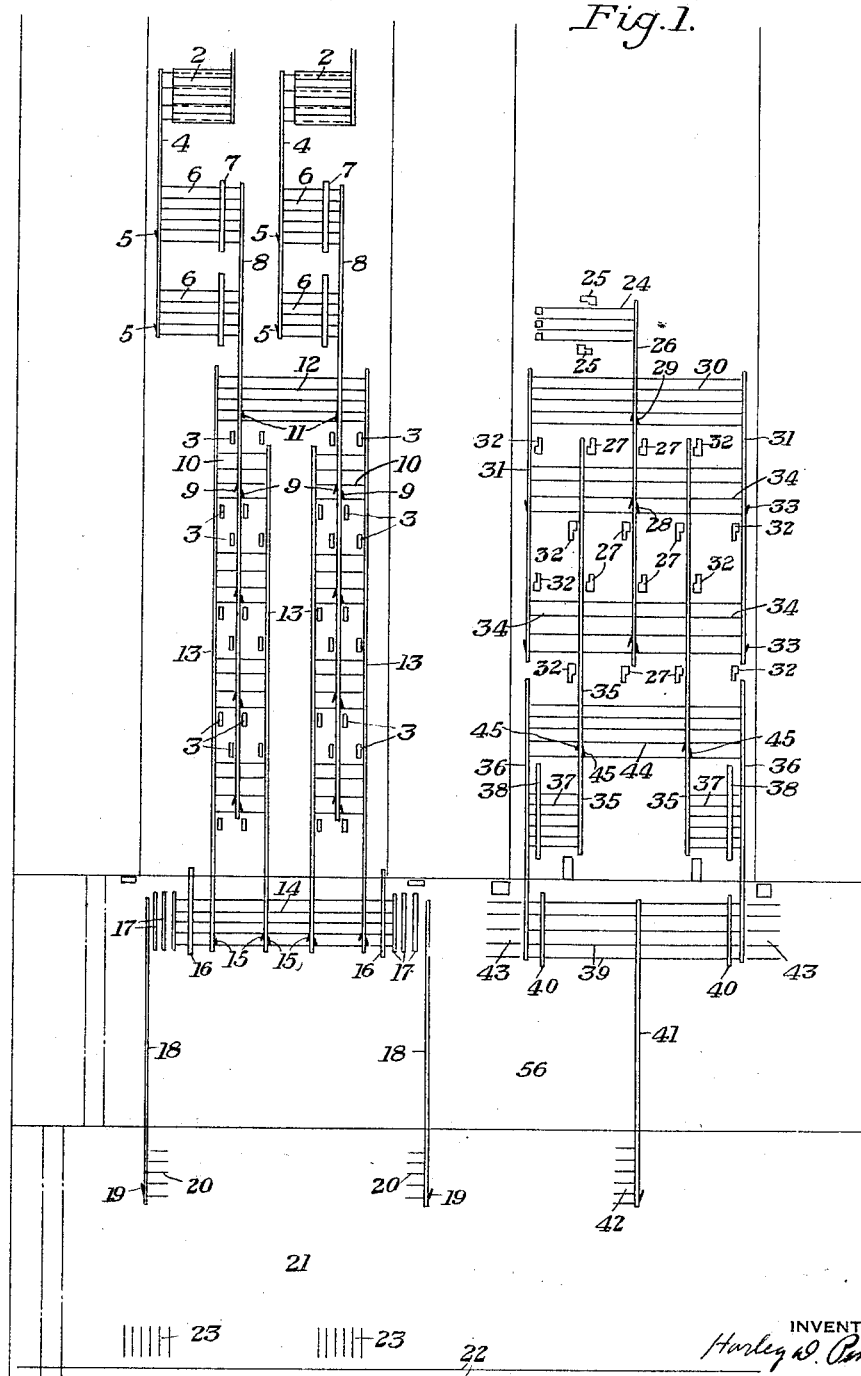

1,657,315

UNITED STATES PATENT OFFICE.

HARLEY D. PENNINGTON, OF PITTSBURGH, PENNSYLVANIA, ASSIGNOR TO UNITED ENGINEERING & FOUNDRY COMPANY, OF PITTSBURGH, PENNSYLVANIA, A CORPORATION OF PENNSYLVANIA.

APPARATUS FOR AND METHOD OF DELIVERING PIPE TO AND FROM THREADING MACHINES AND TESTERS.

Application filed August 28, 1923. Serial No. 659,709.

The present invention relates to the manufacture of pipe, and more particularly to an improved method and apparatus for handling pipe in connection with threading and testing machines.

It is customary to deliver pipe from the butt or lap welding mill onto a rack from which it is delivered either by means of a crane or by means of trucks to the various threading machines. After the pipe has been threaded, it is again carried in a similar manner to the pipe testing machines. This also may involve turning the pipe ninety degrees, depending upon the general arrangement of the pipe threading machines, testing machines and racks. These methods of handling the pipe have certain serious disadvantages. On the one hand, with overhead cranes, there is the ever present danger to the workmen, and the mental hazard which they have when working with such devices tends to lower their efficiency. Moreover, when the cranes are working, the workmen have to pause in their work to avoid being struck. These interruptions naturally tend to decrease the output. On the other hand, handling the pipe by means of trucks is inefficient because it requires a relatively large amount of manual handling of the pipe.

In accordance with the present invention, it is proposed to deliver the pipe directly from the rack, upon which it is received from the butt or lap welding mill, to a live roller table from which it may be distributed by means including other live roller tables and racks to the various pairs of threading machines, then to the testing machines, and finally to the storage space or warehouse, or, in case the pipe tested proves defective, to a rack for receiving defective pipe.

In the accompanying drawings, there are shown, for purposes of illustration only, certain embodiments of my invention, it being understood that the drawings do not define the limits of the invention, as changes may be made in the construction and operation therein disclosed, without departing from the spirit of the invention, or scope of my broader claims.

In the drawings:

Figure 1 is a diagrammatic view illustrating my invention in connection with pipe threading and testing machines associated with a butt welding and a lap welding mill;

Figure 2 is a plan view, partly broken away, illustrating a live roller table which may be employed in connection with my invention;

Figure 3 is a diagrammatic view illustrating a slight modification of my invention in connection with the pipe threading and testing machines of a lap welding mill.

Figures 4, 5:
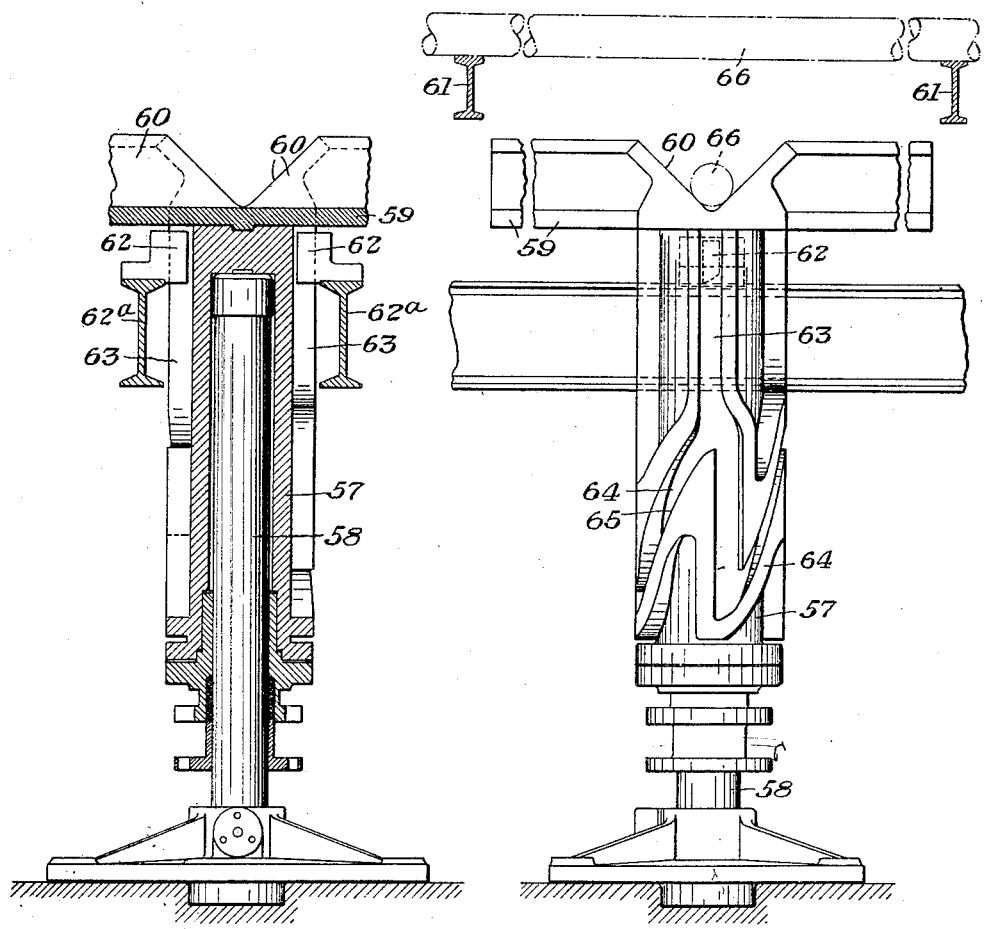
Figures 4 and 5 are, respectively, a vertical sectional view and an elevation of pipe turning means employed in connection with the modified form of the invention illustrated in Figure 3.

Referring to Figure 1, and more particularly to the left hand portion thereof, 2 indicates the usual rack for receiving the pipe from a butt welding mill (not shown). As previously stated, it has heretofore been customary to deliver the pipe from these racks to the various pairs of pipe threading machines 3 by means of overhead cranes or trucks. In accordance with the present invention, the pipe may be delivered from either rack 2 to a live roller table 4 having deflectors 5 associated therewith for deflecting it onto one or the other of a pair of racks 6. Testing means 7 may be associated with each of the racks 6 whereby the pipe may be tested before delivery to another live roller table 8.

Arranged on opposite sides of each live roller table 8 may be a plurality of pairs of threading machines 3. Deflectors 9 and racks 10 are associated with each live roller table 8, whereby a pipe carried thereby may be delivered to any desired pair of threading machines. If desired, each live roller table 8 may also have associated therewith an additional deflector 11, whereby a pipe carried by one of said tables may be switched over to the other of said tables previous to being delivered to the desired pair of threading machines, a rack 12 extending across and between said tables 8 for that purpose.

Each live roller table 8 has at opposite sides thereof and extending parallel therewith a pair of additional live roller tables 13 for receiving the pipe after being threaded and delivering it to a rack 14, deflectors 15 being provided for deflecting it onto said rack. The rack 14 has associated therewith means 16 and 17 for testing and weighing the pipe.

After being tested and weighed, the pipe may be delivered onto live roller tables 18 and delivered therefrom by means of deflectors 19 to racks 20 located in a storage room or space 21. The space or storage room 21 may have car tracks 22 therein along side of which are arranged racks 23. The pipe received on the racks 20 may be moved by means of a crane and placed on the racks 23 for loading into cars on the tracks 22.

Referring to the right hand portion of Figure 1, the arrangement for handling the pipe in connection with the threading machines of the lap welding mill is similar to that for the threading machines of the butt welding mill just described. The pipe from the lap welding mill is delivered as usual upon a receiving rack 24 which may have means 25 associated therewith for cutting off the ends of the pipe. The pipe is delivered from this rack onto a live roller table 26 having on opposite sides thereof a plurality of threading machines 27. The pipe may be delivered from the table 26 to any desired pair of threading machines 27 by means of deflectors 28. On the other hand, the pipe carried by the table 26 may be delivered by means of deflectors 29 and a rack 30 to either of a pair of live roller tables 31 arranged on opposite sides of the table 26 and extending parallel therewith. Each of these live roller tables 31 may have a plurality of pairs of threading machines 32 associated therewith and the pipe may be delivered to any desired pair of threading machines by means of deflectors 33 and racks 34.

Arranged between each live roller table 31 and the live roller table 26 is a live roller table 35, to which the pipe may be delivered after being threaded. Arranged laterally of each live roller table 35 and extending parallel thereto is a live roller table 36, and extending between each table 35 and its corresponding table 36 is a rack 37 having a testing machine 38 associated therewith. The pipe may be delivered from the table 35 to the rack 37 and tested in the testing machine 38, and then delivered to the table 36. A rack 39 extends between the ends of the tables 36 and has associated therewith means 40 for weighing the pipe. The pipe may be delivered from the tables 36 onto the rack 39 and weighed by the means 40 and then placed on another live roller table 41 which extends from the rack 39 into the storage room or space 21, where it has associated therewith a rack 42. On the other hand, the pipe may be delivered from the tables 36 to racks 43 for receiving defective pipe. The defective pipe may be delivered back to the lap welding mill by means of the same live roller tables.

Another rack 44 extends between the inner ends of the tables 36, and deflectors 45 are associated with the tables 35, whereby the pipe may be delivered from one table 35 to the other table 35 before being delivered to the testing means 38.

In Figure 2 there is illustrated a type of live roller table which may conveniently be employed. This table comprises a plurality of grooved rollers 46 and a plurality of flat rollers 47. The rollers 46 and 47 are driven from a motor 48 by means of the driving connection shown and designated generally by the reference numeral 49.

The pipe is first received by the grooved rollers 46 and carried in the direction of the arrow and is then moved by the flat rollers 47. Extending intermediate the flat rollers 47 are a plurality of tables 50. The endmost table 50 has a pair of deflectors 51 associated therewith adapted to be moved into a position to engage the end of the pipe and deflect the pipe to either side of the live roller table. It will be understood of course that the present invention is not limited to the use of any particular type of live roller table, as other types than the one shown may be employed. It will be noted that when the end of a pipe engages one of the deflectors 51 the pipe is being moved by the flat rollers 47. The deflector will then act to deflect the pipe as a whole, causing it to roll off of the conveyor onto a rack 10 at one side of the conveyor. It will be apparent that the pipe being relatively heavy, will be moved bodily by the deflector and will not merely have its leading end swung out of line. Just as soon as the end of the pipe strikes the inclined deflector, the pipe will begin to roll bodily either to one side or the other.

It will be noted that in the arrangement shown in Figure 1, the pipe in being delivered from the racks 2 to the racks 20 in the space 21 or from the rack 24 to the rack 42 travels always in the same direction, so that there is no necessity for turning the pipe. In the arrangement shown in Figure 3, the pipe is delivered to the threading machines and from there to live roller tables 35', as in the construction shown in the right hand portion of Figure 1, the parts in Figure 3 corresponding to the parts shown in the right hand portion of Figure 1 being given the same reference characters with a prime associated therewith. In this arrangement, however, means 52 is provided at the outer end of each live roller table 35' for receiving each pipe and rotating it through an angle of 90 degrees, about an axis extending at right angles to the longitudinal axis of the pipe, and placing it upon a rack 53. The rack 53 has associated therewith testing means 54. Rack 53 extends into a storage room or space 55 having car tracks 55ᵃ therein. The advantage of this modified arrangement lies in the fact that it is only necessary to provide a single storage space 55, whereas in the arrangement shown in Figure 1, an intermediate storage space 56 is required.

Suitable means for turning the pipe through an angle of 90 degrees is illustrated in Figures 4 and 5. This means comprises a fluid pressure actuated cylinder 57 supported upon a vertical plunger 58. The cylinder carries upon its upper end a pipe support 59 having a pair of pipe receiving grooves 60 therein extending at right angles to each other. The rack 53 consists of a plurality of spaced parallel I beams 61 and the support 59 is arranged between a pair of said I beams, and in the lower position thereof is below the plane of a pipe supported on said rack. Lugs 62 are provided for cooperation with slots 63 in the cylinder 57, these lugs projecting from beams 62ª at opposite sides of the cylinder. There are four of these slots 63, 90 degrees apart, in the cylinder 57 and adjacent slots 63 are connected by branch slots 64.

The cylinder is shown in Figures 4 and 5 in the lowered position thereof. When fluid is admitted to the cylinder to raise the same, the lug 62 travels in the upper portion of slot 63 until it strikes a cam surface 65 separating the adjacent branch slot 64 from the lower portion of the slot 63. This cam surface causes the lug 62 to travel in the branch slot 64 and thereby causes the cylinder to be rotated through an angle of 90 degrees.

Assuming that a pipe 66 has been delivered by a table 35' onto the support 59 and rests in a groove 60 thereof, the raising of the cylinder causes the pipe to be raised above the I beams 61 and turned through an angle of 90 degrees. When the cylinder has reached the end of its upward movement, the lug 62 has been carried into the lower end of the next slot 63. The lowering of the cylinder results in the pipe being placed upon the I beams as shown in Figure 5 and the support 59 being brought into position to receive another pipe in the groove 60 thereof extending at right angles to the groove in which the preceding pipe was received. It will be understood of course that the invention is not limited to any specific form of turning means.

The advantages of the present invention arise from the fact that it eliminates the handling of the pipe by overhead cranes or trucks and thereby decreases the danger of accidents to the workmen and increases their efficiency and enables a larger output.

A great advantage of my invention resides in the fact that by my improved method of handling pipe, the bending and twisting of pipe, which is encountered in the old way of handling pipe by overhead cranes, is eliminated. The twisting may occur from the rolling of pipes in a bundle when they are picked up by the crane slings, while the bending or "dinging" is likely to occur when large diameter thin wall pipes are being handled, in which case the localized pressure of the sling frequently dinges one or more of the pipes of the bundle at the point of support.

When either of these things occur, the damaged pipe must be rerouted and either straightened out or sent to a cutting machine, where the dinged portion is cut out and the two sections are made up into a coupled length of pipe.

In the following claims I have defined my invention as applying to wrought metal pipe, so as to distinguish from cast material. The word "wrought" however, is not to be taken as a limitation to any particular metal.

Further advantages arise from the compactness of the apparatus, enabling a greater amount of material to be handled in less space than possible where trucks or the like are used.

I claim:

1. In the method of making threaded wrought metal pipe, the steps consisting in supplying pipes singly and successively from the pipe mill to a conveyor extending to a threading machine and effective for supporting each pipe at a plurality of points during substantially its entire travel, and operating the conveyor to carry the pipes successively to the threading machine whereby bending and twisting of the pipe are substantially eliminated.

2. In the method of making threaded and tested wrought metal pipes, the steps consisting of supplying pipes singly and successively from the pipe mill to a conveyor extending to a threading machine and effective for supporting each pipe at a plurality of points during substantially its entire travel, operating the conveyor to carry the pipes successively to the threading machine, successively supplying the pipes from the threading machine to a conveyor extending to a testing machine and effective for supporting the pipes at a plurality of points during substantially their entire travel, and operating the last mentioned conveyor to carry the pipes successively to the testing machine whereby bending and twisting of the pipes are substantially eliminated.

3. In the method of making and storing threaded and tested wrought metal pipes, the steps consisting in supplying the pipes singly and successively from the pipe mill to a conveyor extending to a threading machine, and effective for supporting each pipe at a plurality of points during substantially its entire travel, operating the conveyor to carry the pipes successively to the threading machine, threading the pipes in the threading machine, then singly and successively supplying the pipes from the threading machine to a conveyor extending to a testing machine and effective for supporting each pipe at a plurality of points during substantially its entire travel, operating the last mentioned conveyor to carry the pipes successively to the testing machine, testing the pipes and then supplying the tested and threaded pipes successively from the testing machine to a conveyor extending to a storage space and effective for supporting each pipe at a plurality of points during substantially its entire travel, and operating such conveyor to carry the pipes successively to the storage space whereby bending and twisting of the pipes are substantially eliminated.

4. In the method of making and testing threaded wrought metal pipes, the steps consisting in supplying unthreaded pipes singly and successively from the pipe mill to a conveyor extending to a threading machine and effective for supporting each pipe at a plurality of points during its travel, operating the conveyor to carry the pipes successively to the threading machine, threading the pipes, turning the pipes singly and successively through an angle and delivering them to a testing machine, the pipes during the latter movement being supported at a plurality of points whereby bending and twisting of the pipes are substantially eliminated throughout the operation.

5. In the method of making and testing threaded wrought metal pipes, the steps consisting in supplying unthreaded pipes from the rack of the pipe mill to a conveyor extending to a threading machine, the conveyor being effective for carrying the pipes singly and successively in a line which is substantially the axial line of the moving pipes, the pipes following one another in such line of travel, and being further effective supporting each pipe at a plurality of points at substantially all times during its travel, whereby bending and twisting of the pipes are substantially eliminated and operating the conveyor to carry the pipes to the threading machine.

6. In a system for the manufacture of threaded wrought metal pipes, a pipe mill rack adapted to receive the pipes as they are formed in the pipe mill, a threading machine and a conveyor lying between the pipe mill rack and the threading machine and extending from said rack to said threading machine, said conveyor being adapted to handle the pipes singly and successively and to support each pipe at a plurality of points during its travel.

7. In a system for the manufacture of threaded and tested wrought metal pipes, a pipe mill rack adapted to receive pipes as they are formed in the pipe mill, a threading machine, a testing machine, a conveyor lying between the pipe mill rack and the threading machine, said conveyor extending from said rack to said threading machine and being adapted to convey the pipes singly and successively thereupon, said conveyor being adapted to support each pipe at a plurality of points during its travel, and a conveyor lying between the threading machine and the testing machine, said conveyor extending from said threading machine to said testing machine and being adapted to handle the pipes singly and successively, and to support each pipe at a plurality of points during its travel.

8. In a system for the manufacture of threaded and tested wrought metal pipes, a pipe mill rack adapted to receive pipes as they are formed in the pipe mill, a threading machine, a testing machine, a conveyor lying between the pipe mill rack and the threading machine, said conveyor extending from said rack to said threading machine and being adapted to convey the pipes singly and successively thereupon, said conveyor being adapted to support each pipe at a plurality of points during its travel, and a conveyor lying between the threading machine and the testing machine, said conveyor extending from said threading machine to said testing machine and being adapted to handle the pipes singly and successively, and means interposed between the threading machine and the testing machine for turning the pipes through an angle.

9. In a system for making, testing and storing threaded wrought metal pipes, a pipe mill rack adapted to receive the pipes as they leave the pipe mill, a threading machine, a testing machine, a conveyor lying between the pipe mill rack and the threading machine, said conveyor extending from said rack to said threading machine and being adapted to handle the pipes singly and successively and to support each pipe at a plurality of points during its travel, a conveyor lying between the threading machine and the testing machine, said conveyor extending from said threading machine to said testing machine and being adapted to handle the pipes singly and successively and to support each of them at a plurality of points during its travel, and a conveyor lying between the testing machine and a storage space, said conveyor extending from said testing machine to said storage space and being adapted to handle the pipes singly and successively and to support each of them at a plurality of points during its travel.

10. In a system for making, testing and storing threaded wrought metal pipes, a pipe mill rack adapted to receive the pipes as they leave the pipe mill, a threading machine, a testing machine, a conveyor lying between the pipe mill rack and the threading machine, said conveyor extending from said rack to said threading machine and being adapted to handle the pipes singly and successively and to support each pipe at a plurality of points during its travel, a conveyor lying between the threading machine and the testing machine, said conveyor extending from said threading machine to said testing machine and being adapted to handle the pipes singly and successively and to support each of them at a plurality of points during its travel, and a conveyor lying between the testing machine and a storage space, said conveyor extending from said testing machine to said storage space and being adapted to handle the pipes singly and successively and to support each of them at a plurality of points during its travel, and means for turning the pipes through an angle after they leave the threading machine and before they reach the storage space.

11. In a system for the manufacture of threaded wrought metal pipes, a pipe mill rack adapted to receive the pipes as they are formed in the pipe mill, a threading machine, and a conveyor comprising a roller table extending from the pipe mill rack to the threading machine and adapted to handle the pipes singly and successively and to support each pipe at a plurality of points during its travel from the rack to the threading machine.

12. In a system for the manufacture of threaded and tested wrought metal pipes, a pipe mill rack adapted to receive pipes as they are formed in the pipe mill, a rotating machine, a testing machine, a conveyor comprising a roller table extending from the pipe mill rack to the threading machine and adapted to handle the pipes singly and successively and to support each pipe at a plurality of points during its travel from the pipe mill rack to the threading machine, and a conveyor comprising a roller table extending from the threading machine to the testing machine and adapted to handle the pipes singly and successively and to support each pipe at a plurality of points during its travel from the threading machine to the testing machine.

13. In a system for the manufacture and storage of threaded and tested wrought metal pipes, a pipe mill rack adapted to receive pipes as they are formed in the pipe mill, a threading machine, a testing machine, a conveyor comprising a roller table extending from the pipe mill rack to the threading machine, a conveyor comprising a roller table extending from the threading machine to the testing machine, and a conveyor comprising a roller table extending from the testing machine to a storage space, each of said roller tables being adapted to convey pipes singly and successively along its length, and to support each pipe at a plurality of points during its travel.

In testimony whereof I have hereunto set my hand.

HARLEY D. PENNINGTON.